A. R. COOPER.
THRESHING MACHINE.
APPLICATION FILED MAY 22, 1911.
1,021,917.
Patented Apr. 2, 1912.
2 SHEETS—SHEET 2.
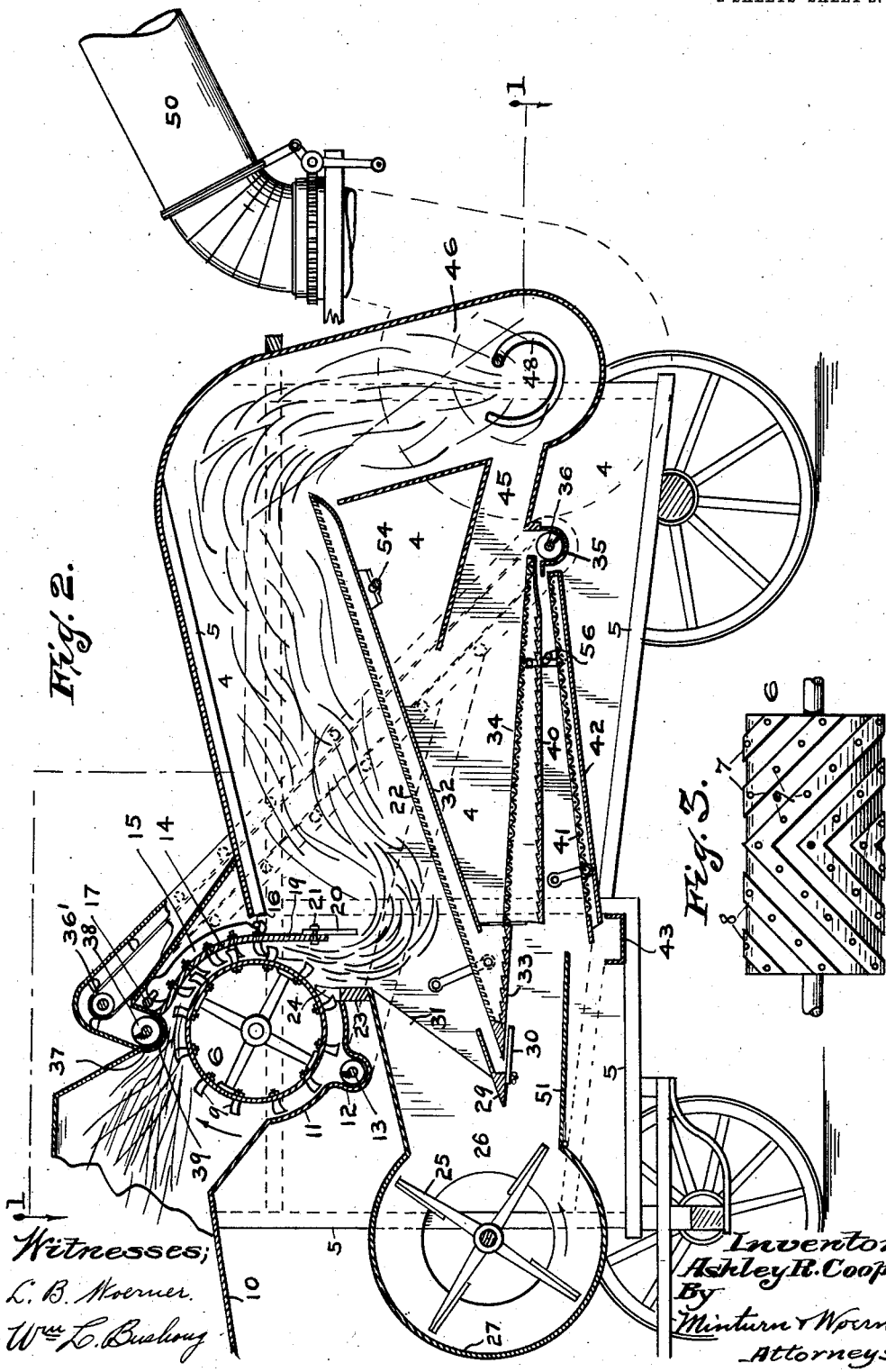

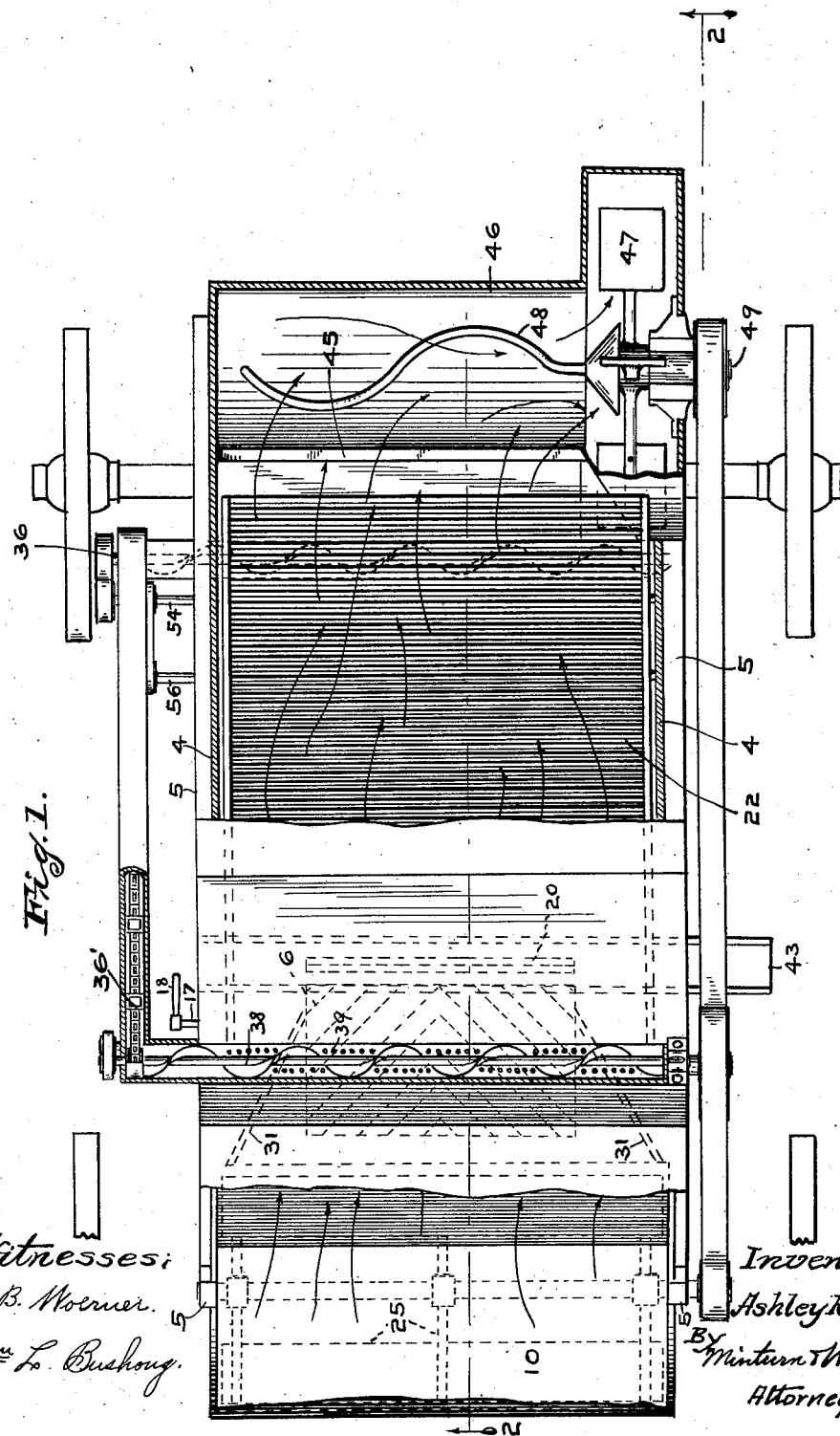

UNITED STATES PATENT OFFICE.

ASHLEY R. COOPER, OF MOORESVILLE, INDIANA.

THRESHING-MACHINE.

1,021,917.  Specification of Letters Patent.  Patented Apr. 2, 1912.

Application filed May 22, 1911. Serial No. 628,799.

*To all whom it may concern:*

Be it known that I, ASHLEY R. COOPER, a citizen of the United States, residing at Mooresville, in the county of Morgan and State of Indiana, have invented certain new and useful Improvements in Threshing-Machines, of which the following is a specification.

This invention relates to improvements in machines for threshing grain and the object is to effectually thresh, clean and separate the grain from the straw and chaff.

I accomplish the object by the mechanism illustrated in the accompanying drawings, in which—

Figure 1 is a top plan view and partial horizontal section of my improved threshing machine on the line 1—1 of Fig. 2. Fig. 2 is a vertical section on the line 2—2 of Fig. 1 and Fig. 3 is a detached plan view of the threshing cylinder with the spikes removed.

Like characters of reference indicate like parts throughout the several views of the drawings.

The sides 4 and other parts of the machine are supported by a frame 5 of usual and suitable construction.

6 is the threshing cylinder preferably comprising a cylindrical drum of solid metal supported by radial arms as shown in Fig. 2, upon the periphery of which drum a plurality of oblique bars 7 and 8 are secured. These bars diverge from a transverse plane through the middle of the cylinder and each bar is provided with a longitudinal row of spikes 9. The diverging bars and their correspondingly diverging rows of spikes serve to spread the straw and distribute it across the machine to prevent choking and to insure thorough and uniform treatment of all the grain in the straw going through the machine.

10 is the feed table which is arranged in front of the cylinder 6 to receive the grain in the straw preparatory to its being threshed.

11 is the cylinder-casing within which the lower half of the cylinder 6 is situated. It has a trough 12 at the bottom to receive the grain which is separated by the cylinder above and drops down into the casing 11, and located in the trough is a screw conveyer 13, the rotation of which conveys the grain to the oblique trough $13^1$ which conveys the grain to the elevator $36^1$.

14 is the concave having outer ribs 15 by which it is supported. The lower ends of the ribs are hooked to swingingly engage a bar 16 and the upper ends are notched to engage a spline in a bar 17 which is rocked from the outside of the machine by handle 18. By this means the upper end of the concave may be swingingly adjusted toward or from the cylinder 6 and the extension 19 moved in a reverse direction, whereby the discharge between the cylinder and the concave may be regulated.

The cylinder is rotated in a direction indicated by the arrow in Fig. 2 that is, as an over-shot cylinder, to cause the grain and straw to pass over it, and this material is directed downwardly by the extension 19 and its adjustable continuation 20. The continuation 20 is a board adapted to be raised or lowered by means of bolts 21, and the threshed grain and straw are directed downward upon a slatted vibrating table 22 by extension 19 and board 20. By delivering the product from an overshot cylinder it is thrown with more force against the slatted table and against the air-blast than would be possible by the use of an undershot cylinder, and better results are secured.

Extending transversely of the machine at the end of casing 11 is a wooden header 23 which supports spikes 24 which rake the straw from the cylinder spikes and insure a complete discharge to the table 22. The table 22 extends upwardly and rearwardly in the path of a current of air from a rotating fan 25, here shown as located below and in front of the cylinder 6, in a suitable housing 27. The lower end of the table 22 is above the bottom of the discharge opening 26 from housing 27, whereby a part of the air blast will be directed under the table. The major portion of the air blast goes above the table 22, however, and the amount going below is regulated by an adjustable board 30 which may be moved toward or from the fan to vary the size of the lower opening. A transverse shoe 29 is adjusted toward and from the fan with the board 30. The length of the cylinder 6 is about two-thirds the width of the machine, and the length of the fan is the full width of the machine, which requires rearwardly converging sides 31 (see dotted lines in Fig. 1) to reduce the width of the air blast. Secured to the same frame under the slatted table 22 is a solid table 32, upon which the grain falling between the slats, is deposited and down which it slides by gravity and is discharged upon the riddles 33, which slope in the opposite direction and in turn discharge upon the woven wire screen 34. The unhulled and imperfectly threshed product at this stage is deposited in trough 35 whence it is conveyed by the screw conveyer 36 to elevator $36^1$ by which it is carried to a trough 37 above the cylinder and is distributed by conveyer 38 uniformly across the cylinder and is forced through the bottom of the trough which has the perforations 39 to permit their passage.

The good grain passes through riddle 40 to vibrating screen 41 and through the latter to oblique table 42 down which it moves by gravity to trough 43 which carries it out of the machine to be sacked in the usual way. A current of air from fan 25 passes through the screens 34 and 41 and blows the chaff up through discharge outlet 45 into the hopper 46 where it mingles with the straw discharging over the upper end of the table 22. A fan 47 located at one end of hopper 46 draws the straw and chaff into it, aided by the spiral bar 48 attached to the fan shaft 49 and rotating with the latter. The fan discharges through a stacker tube 50 and is stacked in the usual manner. The bottom 51 of the air duct leading from fan housing 27 is hinged to the housing to permit of a swinging vertical adjustment of its free end whereby the air to the screens 34 and 41 may be regulated. The frame carrying table 22 is vibrated by connection with the cranks of a rotating cranked shaft 54. The frame carrying the screen 34 is supported near one end by a similarly cranked rotating shaft 56 and its opposite or front end is hinged to the frame carrying table 22. All of the rotating shafts are driven from a suitable source of power (not shown) by suitably arranged belts.

Having thus fully described my invention, what I claim as new and wish to secure by Letters Patent of the United States, is—

1. In a threshing machine, means comprising a fan for producing a substantially horizontal current of air, a table located in the air current and extending in the same general direction therewith, a spiked overshot cylinder having spikes in oblique rows diverging from the middle of the cylinder and a spiked concave operating therewith and both located above the front end of the table and adjustable means for directing the threshed product toward the front of the table substantially at right-angles through said air current.

2. In a threshing machine, means for producing a substantially horizontal current of air, a vibrating slatted table located in the air current and extending in the same general direction therewith, means under the table for separating the grain and chaff, means between the air current producing means and the table for directing a part of the air current above and part below the table, and means located above the table for loosening the grain from the straw and for delivering the product substantially in a vertical and downward direction to the air current and upon the front end of the table.

3. In a threshing machine, means for producing a substantially horizontal current of air, a vibrating perforated table located in the air current and extending in the same general direction therewith, means under the table for separating the grain from the chaff, means for diverting a part of the air current to the separating means under the table and for regulating the amount of current so diverted, and means located above the table for loosening the grain from the straw and for delivering the product substantially in a vertical and downward direction to the air current and upon the front end of the table.

In witness whereof, I, have hereunto set my hand and seal at Indianapolis, Indiana, this 15th day of May, A. D. one thousand nine hundred and eleven.

ASHLEY R. COOPER. [L. S.]

Witnesses:
C. S. COOPER,
F. W. WOERNER.

---

Copies of this patent may be obtained for five cents each, by addressing the "Commissioner of Patents. Washington, D. C."